(12) United States Patent
Watanabe (10) Patent No.: US 8,515,625 B2
(45) Date of Patent: Aug. 20, 2013

(54) VEHICLE BEHAVIOR CONTROLLING APPARATUS

(75) Inventor: Ryochi Watanabe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 287 days.

(21) Appl. No.: 13/132,830

(22) PCT Filed: Dec. 16, 2008

(86) PCT No.: PCT/JP2008/072883
§ 371 (c)(1),
(2), (4) Date: Jun. 3, 2011

(87) PCT Pub. No.: WO2010/070738
PCT Pub. Date: Jun. 24, 2010

(65) Prior Publication Data
US 2011/0238268 A1    Sep. 29, 2011

(51) Int. Cl.
*B60R 22/00* (2006.01)
*G05D 1/00* (2006.01)

(52) U.S. Cl.
USPC .......... 701/48; 701/41; 701/70; 701/78; 701/72; 303/20; 303/191; 280/750; 180/271

(58) Field of Classification Search
USPC .......... 701/41, 48, 70, 78, 72; 303/20, 303/191; 280/750; 180/271
See application file for complete search history.

(56) References Cited

U.S. PATENT DOCUMENTS

| 4,313,166 A * | 1/1982 | Rode et al. ............... 701/79 |
| 5,711,582 A * | 1/1998 | Koike ............... 303/11 |
| 2006/0241828 A1 | 10/2006 | Yasui et al. |
| 2007/0282510 A1 | 12/2007 | Nimmo et al. |
| 2008/0103666 A1 * | 5/2008 | Mun ............... 701/70 |
| 2008/0234909 A1 * | 9/2008 | Iwasaki et al. ............... 701/70 |
| 2009/0118905 A1 * | 5/2009 | Takenaka et al. ............... 701/41 |
| 2011/0082623 A1 * | 4/2011 | Lu et al. ............... 701/41 |
| 2011/0130923 A1 * | 6/2011 | Watanabe ............... 701/41 |

FOREIGN PATENT DOCUMENTS

| JP | A-2002-127885 | 5/2002 |
| JP | A-2006-298212 | 11/2006 |
| JP | 2007-070971 | * 3/2007 |
| JP | A-2007-513002 | 5/2007 |

(Continued)

OTHER PUBLICATIONS

Development of a Remotely Operated Ship Hull Inspection Vehicle; Nicinski, S.; OCEANS '83, Proceedings Digital Object Identifier: 10.1109/OCEANS.1983.1152187; Publication Year: 1983, pp. 583-587.*

(Continued)

*Primary Examiner* — Cuong H Nguyen
(74) *Attorney, Agent, or Firm* — Oliff & Berridge, PLC (57) ABSTRACT

An electronic control unit is provided with a preparatory brake pressure controlling unit that, when steering operation in an opposite direction is detected after the steering operation of a steering wheel in one direction, applies a preparatory brake pressure to a wheel, which becomes an outer wheel in turning next along with the steering operation in the opposite direction, and the preparatory brake pressure controlling means is configured to inhibit application control of the preparatory brake pressure when returning operation of the steering wheel to a steering center is detected while the steering operations in the one direction and in the opposite direction are repeated.

5 Claims, 6 Drawing Sheets

(56) References Cited

FOREIGN PATENT DOCUMENTS

| | | | |
|---|---|---|---|
| JP | A-2007-153278 | | 6/2007 |
| KR | 10-2006-0106824 | * | 10/2006 |
| WO | PCT/JP2009/003381 | * | 12/2010 |

OTHER PUBLICATIONS

Identification and control of split-μ road for antilock braking system; Yong Fang et al.; Advanced Computer Control (ICACC), 2010 2nd Inter. Conf. on; vol. 3; Digital Object Identifier: 10.1109/ICACC.2010.5486616; Publication Year: 2010, pp. 298-301.*

Application of Vehicle Dynamics' Active Control to a Realistic Vehicle Model; Dincmen, E.; Acarman, T.; American Control Conference, 2007. ACC '07; Digital Object Identifier: 10.1109/ACC.2007.4282862; Publication Year: 2007, pp. 200-205.*

International Search Report issued in Application No. PCT/JP2008/072883; Dated Jan. 20, 2009 (With Translation).

* cited by examiner

VEHICLE BEHAVIOR CONTROLLING APPARATUS

TECHNICAL FIELD

The present invention relates to a vehicle behavior controlling apparatus that stabilizes behavior of a vehicle when steering operations are continuously performed alternately in right and left directions to a steering wheel (switchback steering).

BACKGROUND ART

In a vehicle body, when the steering operation is performed and it is shifted to turning movement, suspension on a side of an outer wheel in turning is compressed and roll motion is started. In general, when the switchback steering is performed, a roll amount tends to increase when second or subsequent steering operation is performed than at the time of first steering operation. This is because, by the second steering operation in the switchback steering, for example, force in a returning direction (that is to say, extending direction) is generated in the suspension compressed in the first steering operation and transverse acceleration rapidly switches to an opposite direction, and the roll motion by the first steering operation suddenly shifts to the roll motion in the opposite direction to increase roll moment. At that time, yaw motion also suddenly shifts to the opposite direction in response to the second steering operation and yaw moment larger than that when the first steering operation is performed acts on the vehicle body.

The vehicle behavior controlling apparatus, which, when the yaw moment generated when such second or subsequent steering operation is performed is excessive, allows the yaw moment in the opposite direction to act on the vehicle body so as to reduce the yaw moment, thereby keeping the behavior of the vehicle in a stable state while inhibiting an excessive roll amount (roll moment), is conventionally known. The vehicle behavior controlling apparatus generates the yaw moment in the opposite direction by braking force applied to a front outer wheel in turning. At that time, the vehicle behavior controlling apparatus applies in advance a brake fluid pressure (hereinafter, referred to as "preparatory brake pressure") to braking force generating means of the wheel, which becomes the front outer wheel in turning next, and controls such that the braking force can be applied with excellent responsiveness when the wheel actually becomes the outer wheel in turning and requires the generation of the braking force. Hereinafter, the control to apply the preparatory brake pressure is referred to as "preparatory brake pressure control".

For example, the following patent document 1 discloses the vehicle behavior controlling apparatus of this type. The vehicle behavior controlling apparatus of the patent document 1 is configured to apply the preparatory brake pressure to the wheel, which becomes the front outer wheel in turning next along with the steering operation, to exert the light braking force thereon when the second or subsequent steering operation is performed in the switchback steering, and properly apply the braking force to generate the above-described yaw moment in the opposite direction to the wheel when this judges that the excessive yaw moment acts on the vehicle body as a result of the steering operation. In the vehicle behavior controlling apparatus, since the preparatory brake pressure is applied in advance to the wheel, which is the control target when generating the yaw moment in the opposite direction, it is possible to apply the braking force to the wheel with excellent responsiveness as necessary, and to perform the excellent stabilization control of the vehicle behavior by the yaw moment in the opposite direction thereby generated.

Also, the following patent document 2 discloses the technique to make the starting criterion to start applying the second braking force smaller than a predetermined criterion when the turning in one direction is judged in the vehicle behavior controlling apparatus to apply the first braking force to the wheel when the vehicle is judged to turn in one direction and to apply the second braking force to the wheel when this is judged to turn in another direction. According to the technique of the patent document 2, it becomes possible to apply the second braking force early when the second steering operation to turn the vehicle in another direction is performed in the switchback steering, and it is possible to stabilize the behavior of the vehicle while inhibiting the excessive roll amount.

Patent Document 1: Japanese translation of PCT international application No. 2007-513002

Patent Document 2: Japanese Patent Application Laid-open No. 2006-298212

DISCLOSURE OF INVENTION

Problem to be Solved by the Invention

It is desired that starting judgment of the preparatory brake pressure control is started at the time point at which the steering operation in the opposite direction is started. This is because it is possible that a judgment result of the starting judgment is obtained after the behavior of the vehicle corresponding to the steering operation is started when this is performed after finishing the steering operation in the opposite direction, so that it is possible that the braking force control with excellent responsiveness by the application of the preparatory brake pressure cannot be performed and the excellent stabilization of the vehicle behavior cannot be obtained. Therefore, also when the operator returns the steering wheel to a neutral position (that is to say, position to return the vehicle in a straight travel state, a so-called steering center) in the middle of the switchback steering to stop the steering operation, it is judged that the starting condition of the preparatory brake pressure control is satisfied and the preparatory brake pressure control is executed. At that time, the yaw moment associated with previous steering operation and the yaw moment in the opposite direction for inhibiting the yaw moment to stabilize the behavior of the vehicle act on the vehicle body. Before the returning operation to the steering center is performed, the vehicle travels with stable behavior in the turning direction corresponding to the steering operation by each yaw moment. The yaw moment in the opposite direction at that time is generated by the braking force to the front outer wheel in turning to which the preparatory brake pressure is applied along with the previous steering operation. However, when the returning operation to the steering center is performed, the preparatory brake pressure is applied to the front wheel opposite to the front outer wheel in turning, so that the yaw moment in the opposite direction becomes smaller than that before the returning operation is performed. Therefore, when the returning operation to the steering center is performed in the middle of the switchback steering, the control accuracy of the behavior stabilization of the vehicle is deteriorated.

Therefore, an object of the present invention is to provide the vehicle behavior controlling apparatus capable of improving disadvantage of such conventional example and improving the control accuracy of the behavior stabilization of the vehicle when the returning operation of the steering wheel to the steering center is performed in the middle of the switchback steering.

Means for Solving Problem

In order to achieve the above mentioned object, a vehicle behavior controlling apparatus according to the present invention includes a preparatory brake pressure controlling means that, when steering operation in an opposite direction is detected after the steering operation of a steering wheel in one direction, applies a preparatory brake pressure to a wheel, which becomes an outer wheel in turning next along with the steering operation in the opposite direction, wherein the preparatory brake pressure controlling means is configured to inhibit application control of the preparatory brake pressure when returning operation of the steering wheel to a steering center is detected while the steering operations in the one direction and in the opposite direction are repeated, Here, it is preferable that the preparatory brake pressure controlling means is configured to inhibit an application amount of the preparatory brake pressure low, thereby inhibiting the application control of the preparatory brake pressure.

Further, it is preferable that the preparatory brake pressure controlling means is configured to forbid the application control of the preparatory brake pressure, thereby inhibiting the application control of the preparatory brake pressure.

It is preferable that a condition to detect the steering operation from the one direction to the opposite direction is set such that it is hard to detect the steering operation from the one direction to the opposite direction when the application control of the preparatory brake pressure is being inhibited.

It is preferable that a detection of the steering operation from the one direction to the opposite direction is performed based on a comparison of transverse acceleration of a vehicle, a steering angle speed of the steering wheel and yaw angle acceleration of the vehicle with each of predetermined threshold values, respectively.

Effect of Invention

The vehicle behavior controlling apparatus according to the present invention inhibits the application control of the preparatory brake pressure when the returning operation of the steering wheel to the steering center is performed in the middle of the switchback steering. Therefore, the vehicle behavior controlling apparatus can prevent a situation in which the preparatory brake pressure associated with erroneous judgment that it is the switchback steering is applied to the front wheel or the rear wheel opposite to the wheel, which is the control target in the preparatory brake pressure control associated with the previous normally executed switchback steering. Therefore, the vehicle behavior controlling apparatus does not unnecessarily decrease the yaw moment in the opposite direction generated in the previous vehicle behavior control, so that the control accuracy of the behavior stabilization of the vehicle when performing the returning operation of the steering wheel to the steering center in the middle of the switchback steering can be improved.

EXPLANATION OF LETTERS OR NUMERALS

1 Electronic control unit (ECU)
10 Vehicle
21 Steering wheel
25 Steering operation amount detecting means
35 Brake actuator
$37_{FL}$, $37_{FR}$, $37_{RL}$, $37_{RR}$ Braking force generating means
81 Transverse acceleration detecting means
82 Yaw rate sensor
$W_{FL}$, $W_{FR}$, $W_{RL}$, $W_{RR}$ Wheel

BEST MODE(S) FOR CARRYING OUT THE INVENTION

Embodiments of a vehicle behavior controlling apparatus according to the present invention are hereinafter described in detail with reference to the drawings. Meanwhile, the present invention is not limited by the embodiments.

Embodiments

[First Embodiment]

A first embodiment of the vehicle behavior controlling apparatus according to the present invention is described with reference to FIGS. 1 to 4.

Figure 1:
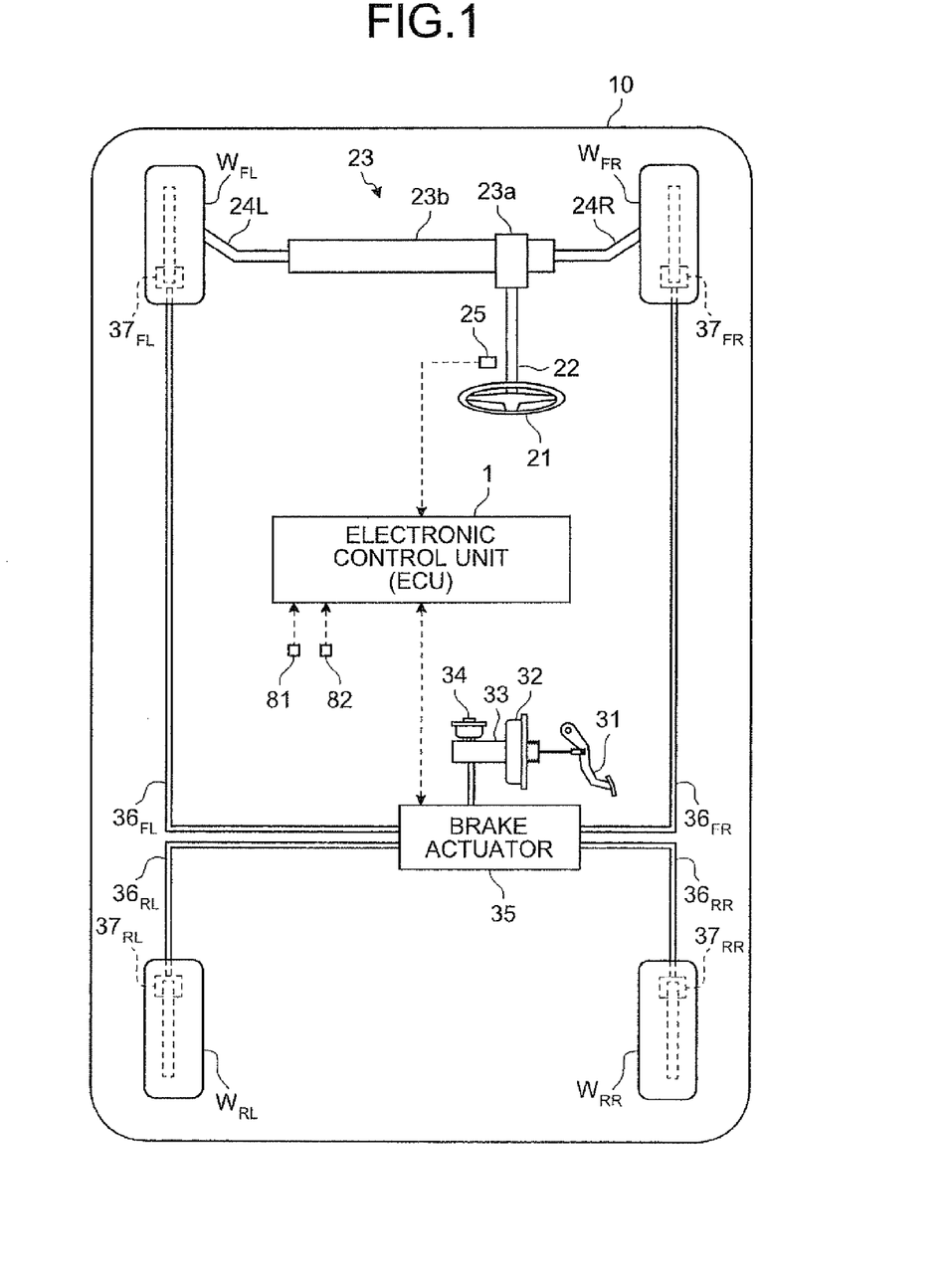
FIG. 1 is a view illustrating an example of a vehicle, which is a target of applying a vehicle behavior controlling apparatus according to the present invention.

It is assumed that the vehicle behavior controlling apparatus of the first embodiment is prepared as one function of an electronic control unit (ECU) 1 illustrated in FIG. 1. The electronic control unit 1 is composed of a central processing unit (CPU) not illustrated, a read only memory (ROM), which stores a predetermined control program and the like in advance, a random access memory (RAM) for temporarily storing an operation result of the CPU, a backup RAM for storing information and the like prepared in advance and the like.

[Vehicle]

First, an example of a vehicle 10 to which the vehicle behavior controlling apparatus is applied is illustrated in FIG. 1.

The vehicle 10 is equipped with a steering device for steering steered wheels $W_{FL}$ and $W_{FR}$ by steering operation of an operator. The steering device is provided with a steering wheel 21 operated by the operator, a steering shaft 22 connected to the steering wheel 21, steering torque transmitting means 23 for transmitting steering torque of the steering shaft 22 toward right and left steered wheels $W_{FR}$ and $W_{FL}$, tie rods 24L and 24R for connecting the steering torque transmitting means 23 and the steered wheels $W_{FL}$ and $W_{FR}$, respectively, and steering operation amount detecting means 25 for detecting a steering operation amount of the steering wheel 21 by the operator.

The steering torque transmitting means 23 is a so-called rack and pinion mechanism composed of a pinion gear 23a arranged on a tip end of the steering shaft 22 and a rack gear 23b, which meshes with the pinion gear 23a. In the steering device, the right and left tie rods 24R and 24L are connected to both ends of the rack gear 23b and the steered wheels $W_{FL}$ and $W_{FR}$ connected to the tie rods 24L and 24R, respectively, are steered together with movement of the rack gear 23b.

The steering operation amount is intended to mean, for example, a steering angle δ. The steering operation amount detecting means 25 detects the steering angle δ from a rotational angle of the steering shaft 22 and transmits a detection signal to the electronic control unit 1. The steering angle δ is detected as a positive value when the steering wheel 21 is steering-operated in a counterclockwise direction (left turning direction) from a neutral position (steering center) and is detected as a negative value when this is steering-operated in a clockwise direction from the steering center. In the electronic control unit 1, operation of a steering angle speed ωstr is carried out based on a change amount of the steering angle δ with time (ωstr=dδ/dt). Therefore, the steering angle speed ωstr is a positive value when the steering wheel 21 is steering-operated in the counterclockwise direction and a negative value when this is steering-operated in the clockwise direction.

Meanwhile, although the steering device in which the steering wheel 21 and the steered wheels $W_{FL}$ and $W_{FR}$ are mechanically connected is herein illustrated, the steering device may be a so-called steer-by-wire type without the mechanical connection therebetween.

Also, the vehicle 10 is provided with a power source such as an engine and a motor not illustrated. The vehicle 10 transmits power of the power source to a drive wheel as driving force to travel. The vehicle 10 is equipped with a brake device for stopping or decelerating the vehicle 10 in travel. The brake device is configured to be able to generate target wheel braking torque (target wheel braking force) for each of wheels $W_{FL}$, $W_{FR}$, $W_{RL}$ and $W_{RR}$ by individual magnitude. The device for generating frictional force between engaging elements utilizing force of a brake fluid pressure, thereby exerting the target wheel braking torque (target wheel braking force) on the wheels $W_{FL}$, $W_{FR}$, $W_{RL}$ and $W_{RR}$ is herein illustrated.

Figure 2:
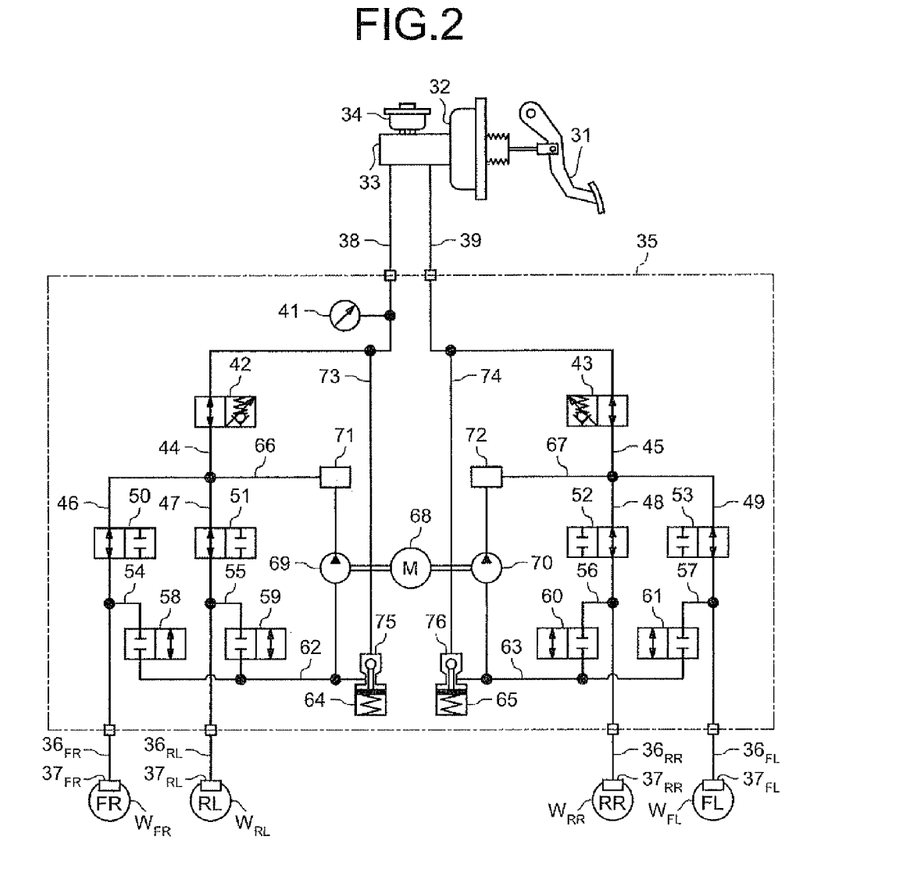
FIG. 2 is a view illustrating an example of a brake actuator.

First, the brake device is provided with a brake pedal 31 operated by the operator, brake servo means (brake booster) 32 for doubling an operation pressure (pedal force) associated with brake operation input to the brake pedal 31 at a predetermined doubling ratio, a master cylinder 33 for converting the pedal force doubled by the brake servo means 32 to the brake fluid pressure corresponding to an operation amount of the brake pedal 31 (hereinafter, referred to as a "master cylinder pressure") and a reservoir tank 34 for reserving brake fluid, as illustrated in FIGS. 1 and 2. The brake pedal 31, the brake servo means 32 and the like serve as brake fluid pressure generating means for generating the brake fluid pressure corresponding to the operation amount of the brake pedal 31 by the operator.

Also, the brake device is provided with brake fluid pressure adjusting means (hereinafter, referred to as a "brake actuator") 35 capable of adjusting the master cylinder pressure for each of the wheels $W_{FL}$, $W_{FR}$, $W_{RL}$ and $W_{RR}$, brake fluid pressure lines $36_{FL}$, $36_{FR}$, $36_{RL}$ and $36_{RR}$ of the wheels $W_{FL}$, $W_{FR}$, $W_{RL}$ and $W_{RR}$, respectively, to each of which the brake fluid pressure (master cylinder pressure or the brake fluid pressure obtained by adjusting the master cylinder pressure) through the brake actuator 35 is transmitted, and braking force generating means $37_{FL}$, $37_{FR}$, $37_{RL}$ and $37_{RR}$ to which the brake fluid pressure of the brake fluid pressure lines $36_{FL}$, $36_{FR}$, $36_{RL}$ and $36_{RR}$ is supplied for generating wheel braking torque (wheel braking force) in the wheels $W_{FL}$, $W_{FR}$, $W_{RL}$ and $W_{RR}$, respectively, as illustrated in FIGS. 1 and 2.

Each of the braking force generating means $37_{FL}$, $37_{FR}$, $37_{RL}$ and $37_{RR}$ is a frictional brake device for applying frictional force to a member, which rotates integrally with each of the wheels $W_{FL}$, $W_{FR}$, $W_{RL}$ and $W_{RR}$, thereby inhibiting rotation of each of the wheels $W_{FL}$, $W_{FR}$, $W_{RL}$ and $W_{RR}$ to perform brake operation. For example, although not illustrated in detail, each of the braking force generating means $37_{FL}$, $37_{FR}$, $37_{RL}$ and $37_{RR}$ is provided with a disc rotor individually attached so as to be integral with each of the wheels $W_{FL}$, $W_{FR}$, $W_{RL}$ and $W_{RR}$, respectively, a brake pad as a frictional material for generating the frictional force by being pressed against the disc rotor and a caliper fixed to a vehicle main body for pressing the brake pad toward the disc rotor by the brake fluid pressure supplied from the brake actuator 35. In each of the braking force generating means $37_{FL}$, $37_{FR}$, $37_{RL}$ and $37_{RR}$, the brake pad is pressed against the disc rotor by pressurizing force corresponding to the master cylinder pressure or the brake fluid pressure after being adjusted transmitted from the brake actuator 35. Therefore, in each of the wheels $W_{FL}$, $W_{FR}$, $W_{RL}$ and $W_{RR}$, the wheel braking torque (wheel braking force) of magnitude corresponding to the master cylinder pressure or the brake fluid pressure after being adjusted is generated. Hereinafter, braking torque and braking force generated by the master cylinder pressure are referred to as "master cylinder pressure braking torque" and "master cylinder pressure braking force", respectively. Also, the braking torque and the braking force generated by the brake fluid pressure after adjustment obtained by pressurizing the master cylinder pressure are referred to as "pressurized braking torque" and "pressurized braking force", respectively.

The brake actuator 35 of the first embodiment is illustrated as being provided with a first brake fluid pressure circuit system for transmitting the brake fluid pressure to a right front wheel $W_{FR}$ and a left rear wheel $W_{RL}$ and a second brake fluid pressure circuit system for transmitting the brake fluid pressure to a left front wheel $W_{FL}$ and a right rear wheel $W_{RR}$. That is to say, the brake actuator 35 has a structure with an X-line brake fluid pressure circuit.

Herein, two hydraulic chambers not illustrated are provided in the master cylinder 33 and the above-described master cylinder pressure is generated in each of the hydraulic chambers. One of the master cylinder pressures generated in the hydraulic chambers is supplied to the right front wheel $W_{FR}$ and the left rear wheel $W_{RL}$ through the first brake fluid pressure circuit system of the brake actuator 35 and the other is supplied to the left front wheel $W_{FL}$ and the right rear wheel $W_{RR}$ through the second brake fluid pressure circuit system of the brake actuator 35. Therefore, the brake device of the first embodiment is provided with first and second brake fluid pressure lines 38 and 39, one ends of which are connected to the hydraulic chambers and the other ends of which are connected to the first and second brake fluid pressure circuit systems. That is to say, the brake actuator 35 has the structure with the X-line brake fluid pressure circuit and supplies the brake fluid pressures (master cylinder pressures) in the first and second brake fluid pressure lines 38 and 39 to the braking force generating means $37_{FL}$, $37_{FR}$, $37_{RL}$ and $37_{RR}$ directly or after the adjustment. The brake actuator 35 operates according to a control instruction of the brake fluid pressure controlling means of the electronic control unit 1.

The brake actuator 35 is provided with a master cylinder pressure sensor 41 for detecting the brake fluid pressure supplied from the master cylinder 33 (that is to say, the master cylinder pressure). The master cylinder pressure sensor 41 is arranged in one of the first and second brake fluid pressure lines 38 or 39 for transmitting the detection signal to the electronic control unit 1. Herein, the master cylinder pressure sensor 41 is illustrated to be arranged in the first brake fluid pressure line 38.

Also, the brake actuator 35 is provided with master cut valves 42 and 43 as flow amount adjusting means of the brake fluid in the first and second brake fluid pressure circuit systems, respectively. Herein, the master cut valve 42 is arranged downstream of the master cylinder pressure sensor 41. Each of the master cut valves 42 and 43 is a so-called normal open type flow amount adjusting electromagnetic valve, which is normally in an opened state, and control of an opening degree of the valve is executed along with energization by the brake fluid pressure controlling means of the electronic control unit 1. That is to say, each of the master cut valves 42 and 43 adjusts the pressure of the brake fluid discharged from each of pressurizing pumps 69 and 70 to be described later by controlling the opening degree of the valve according to an energization amount to release toward the master cylinder 33. Meanwhile, downstream in the first embodiment is intended to mean a downstream side in a flow direction of the brake fluid at the time of the pedal operation (that is to say, a direction toward the braking force generating means $37_{FL}$, $37_{FR}$, $37_{RL}$ and $37_{RR}$).

In the brake actuator 35, the first brake fluid pressure line 38 is connected to a connection path 44 through the master cut valve 42, on the other hand, the second brake fluid pressure line 39 is connected to a connection path 45 through the master cut valve 43. Then, two branched paths 46 and 47 are connected to the connection path 44 of the first brake fluid pressure circuit system so as to be branched therefrom, and two branched paths 48 and 49 are connected to the connection path 45 of the second brake fluid pressure circuit system so as to be branched therefrom. In the first brake fluid pressure circuit system, the branched paths 46 and 47 are connected to the brake fluid pressure line $36_{FR}$ of the right front wheel $W_{FR}$ and to the brake fluid pressure line $36_{RL}$ of the left rear wheel $W_{RL}$, respectively. On the other hand, in the second brake fluid pressure circuit system, the branched paths 48 and 49 are connected to the brake fluid pressure line $36_{RR}$ of the right rear wheel $W_{RR}$ and to the brake fluid pressure line $36_{FL}$ of the left front wheel $W_{FL}$, respectively.

Also, brake fluid pressure adjusting units capable adjusting the brake fluid pressure for the braking force generating means $37_{FL}$, $37_{FR}$, $37_{RL}$ and $37_{RR}$ are arranged on the branched paths 46, 47, 48 and 49 for the wheels $W_{FL}$, $W_{FR}$, $W_{RL}$ and $W_{RR}$, respectively. The brake fluid pressure adjusting units are composed of holding valves 50, 51, 52 and 53, brake fluid pressure discharge paths 54, 55, 56 and 57 and pressure reducing valves 58, 59, 60 and 61 prepared for the wheels $W_{FL}$, $W_{FR}$, $W_{RL}$ and $W_{RR}$, respectively. Herein, the holding valves 50, 51, 52 and 53 are arranged on the branched paths 46, 47, 48 and 49, respectively, and further, the brake fluid pressure discharge paths 54, 55, 56 and 57 are connected downstream of the holding valves 50, 51, 52 and 53 so as to be branched from the branched paths 46, 47, 48 and 49, respectively. Then, the pressure reducing valves 58, 59, 60 and 61 are arranged on the brake fluid pressure discharge paths 54, 55, 56 and 57, respectively.

Each of the holding valves 50, 51, 52 and 53 is a so-called normal open type electromagnetic valve, which is in an opened state in a normal non-excited state, and is put into an excited state along with the energization by the electronic control unit 1 to be closed. On the other hand, each of the pressure reducing valves 58, 59, 60 and 61 is a so-called normal close type electromagnetic valve, which is in a closed state in the normal non-excited state and is put into the excited state along with the energization by the brake fluid pressure controlling means to be opened.

Also, herein, a brake fluid pressure discharge/collection path 62 for collecting the brake fluid pressure discharge paths 54 and 55 of the first brake fluid pressure circuit system and a brake fluid pressure discharge/collection path 63 for collecting the brake fluid pressure discharge paths 56 and 57 of the second brake fluid pressure circuit system are prepared, and the brake fluid pressure discharge/collection paths 62 and 63 are connected to auxiliary reservoirs 64 and 65, respectively.

Further, in the first brake fluid pressure circuit system, a pump path 66 branched from a branch point of the connection path 44 and the branched paths 46 and 47 to be connected to the brake fluid pressure discharge/collection path 62 is arranged. Similarly, in the second brake fluid pressure circuit system, a pump path 67 branched from a branch point of the connection path 45 and the branched paths 48 and 49 to be connected to the brake fluid pressure discharge/collection path 63 is arranged.

The pressurizing pumps (pressurizing units) 69 and 70 driven by one motor 68 are arranged on the pump paths 66 and 67, respectively. The pressurizing pumps 69 and 70 are configured to discharge the brake fluid toward the branch points on a side of the master cut valves 42 and 43, respectively, and supply pressurized brake fluid pressure to the branched paths 46 and 47 and to the branched paths 48 and 49, respectively. That is to say, the pressurizing pump 69 of the first brake fluid pressure circuit system increases the brake fluid pressure to be supplied to the braking force generating means $37_{FR}$ and $37_{RL}$ in order to increase the braking force to be generated in the right front wheel $W_{FR}$ and the left rear wheel $W_{RL}$, respectively. On the other hand, the pressurizing pump 70 of the second brake fluid pressure circuit system increases the brake fluid pressure to be supplied to the braking force generating means $37_{FL}$ and $37_{RR}$ in order to increase the braking force to be generated in the left front wheel $W_{FL}$ and the right rear wheel $W_{RR}$, respectively. Meanwhile, the motor 68 is driven by power supplied from a battery not illustrated. Also, dumper chambers 71 and 72 for preventing pulse of the brake fluid discharged from the pressurizing pumps 69 and 70 are arranged in the pump paths 66 and 67, respectively.

Also, suction paths 73 and 74 branched from the first and second brake fluid pressure lines 38 and 39 to be connected to the auxiliary reservoirs 64 and 65, respectively, are arranged in the brake actuator 35, and further, reservoir cut check valves 75 and 76 are arranged on a side of the auxiliary reservoirs 64 and 65 on the suction paths 73 and 74, respectively.

The brake device of the first embodiment thus configured, of which operation is controlled by the brake fluid pressure controlling means of the electronic control unit 1 as described above, performs antilock brake system (ABS) control, vehicle stability control (VSC) and the like. For example, the brake fluid pressure controlling means sets the target wheel braking torque or the target wheel braking force of the wheels $W_{FL}$, $W_{FR}$, $W_{RL}$ and $W_{RR}$, which are control targets, or target vehicle braking torque or target vehicle braking force based on the operation amount of the brake pedal 31 by the operator and a request value from the vehicle behavior controlling apparatus to be described later. When the master cylinder pressure braking torque (master cylinder pressure braking force) is insufficient relative to the target wheel braking torque (target wheel braking force), the brake fluid pressure controlling means obtains a target brake fluid pressure to the braking force generating means $37_{FL}$, $37_{FR}$, $37_{RL}$ and $37_{RR}$, which are the control targets capable of compensating insufficiency, controls the brake actuator 35 based on the target brake fluid pressure to pressurize the master cylinder pressure, and allows the braking force generating means $37_{FL}$, $37_{FR}$, $37_{RL}$ and $37_{RR}$ to generate pressurized braking torque (pressurized braking force) to satisfy the target wheel braking torque (target wheel braking force).

[Vehicle Behavior Controlling Apparatus]

Also, the electronic control unit 1 of the first embodiment is equipped with the vehicle behavior controlling apparatus as one function as described above. The vehicle behavior controlling apparatus is the control device for controlling such that excessive roll moment and yaw moment do not act on a vehicle body by second or subsequent steering operation at the time of switchback steering, which is configured to turn the vehicle 10 with behavior thereof stabilized while inhibiting an excessive roll amount by generating the yaw moment in a direction opposite to this yaw moment in the vehicle body.

Specifically, the vehicle behavior controlling apparatus (electronic control unit 1) is provided with switchback steering detecting means for detecting switchback steering (in other words, steering operation in an opposite direction after the steering operation of the steering wheel 21 in one direction) by the operator. The switchback steering detecting means judges whether it is the time of the switchback steering, which requires application of a preparatory brake pressure, using a comparison result of transverse acceleration $Gy(y)$, which acts on the vehicle body, and a predetermined threshold value $Thgy$ ($>0$), a comparison result of a steering angle speed $\omega str(y)$ of the steering wheel 21 by the operator and a predetermined threshold value $Th\omega str1$ ($<0$), and a comparison result of yaw angle acceleration $\alpha y(y)$, which acts on the vehicle body, and a predetermined threshold value $Th\alpha y1$ ($>0$).

The transverse acceleration $Gy(y)$ is obtained by multiplying transverse acceleration $Gy$ detected by transverse acceleration detecting means 81 illustrated in FIG. 1 by a y sign (1 or −1) related to a yaw motion direction of the vehicle at that time {$Gy(y)=Gy \times y$ sign}. An acceleration sensor and the like for detecting the acceleration in a transverse direction of the vehicle body may be used, for example, as the transverse acceleration detecting means 81. The transverse acceleration $Gy$ is detected as a positive value when the vehicle 10 turns to left and detected as a negative value when this turns to right. Also, as the y sign, "1" is used when the vehicle 10 turns to left and "−1" is used when this turns to right (same for following). Therefore, the transverse acceleration $Gy(y)$ is a positive value in both of left turn and right turn. Herein, information of the transverse acceleration $Gy$ may be used to judge a turn direction of the vehicle 10 based on whether the value is positive or negative.

The steering angle speed $\omega str(y)$ is obtained by multiplying the steering angle speed $\omega str$ calculated from the steering angle δ as described above by the y sign (1 or −1) related to the yaw motion direction of the vehicle at that time {$\omega str(y)= \omega str \times y$ sign}. The steering angle speed $\omega str$ is the positive value when the steering wheel 21 is steering-operated in the counterclockwise direction and the negative value when this is steering-operated in the clockwise direction as described above. Therefore, the steering angle speed $\omega str(y)$ is a negative value at the time of the switchback steering regardless of the turning direction of the vehicle 10.

The yaw angle acceleration $\alpha y(y)$ is obtained by multiplying yaw angle acceleration $\alpha y(y)$ calculated based on a yaw rate y by the y sign (1 or −1) related to the yaw motion direction of the vehicle at that time {$\alpha y(y)=\alpha y \times y$ sign}. The yaw angle acceleration $\alpha y$ is obtained based on a change amount of the yaw rate y, which acts on the vehicle body, with time ($\alpha y=dy/dt$). The yaw rate y can be detected by a yaw rate sensor 82 illustrated in FIG. 1, and this is herein detected as a positive value when the vehicle 10 turns to left and detected as a negative value when this turns to right. Therefore, the yaw angle acceleration $\alpha y$ is obtained as a positive value when the vehicle 10 turns to left and obtained as a negative value when this turns to right. Therefore, the yaw angle acceleration $\alpha y(y)$ is a positive value regardless of the turning direction of the vehicle 10.

When the transverse acceleration $Gy(y)$ is larger than the predetermined threshold value $Thgy$ ($>0$), when the steering angle speed $\omega str(y)$ of the steering wheel 21 is smaller than the predetermined threshold value $Th\omega str1$ ($<0$) and when the yaw angle acceleration $\alpha y(y)$ is smaller than the predetermined threshold value $Th\alpha y1$ ($>0$), the switchback steering detecting means is allowed to judge that it is the time of the switchback steering, which requires the application of the preparatory brake pressure to a predetermined wheel.

Also, the vehicle behavior controlling apparatus (electronic control unit 1) is provided with preparatory brake pressure controlling means for applying the preparatory brake pressure to a predetermined wheel when the switchback steering is detected and allowing the vehicle 10 to turn and travel with the behavior thereof stabilized while inhibiting the excessive roll amount associated with the switchback steering. The preparatory brake pressure controlling means selects the wheel, which becomes a front outer wheel in turning next, based on a steering operation direction of the steering wheel 21 when the switchback steering is detected and applies the preparatory brake pressure before the wheel finishes rolling in an opposite direction.

The preparatory brake pressure is intended to mean the brake fluid pressure for generating light braking force, which does not obviously decrease rotational speeds of the wheels $W_{FL}$ and $W_{FR}$ being the control target, for example, in other words, the brake fluid pressure capable of generating the braking force corresponding to the brake fluid pressure with excellent responsiveness when a larger brake fluid pressure is applied. The preparatory brake pressure is applied to the right front wheel $W_{FR}$ when the steering operation when the switchback steering is detected is to turn to left (turn the steering wheel 21 in the counterclockwise direction) and applied to the left front wheel $W_{FL}$ when the steering operation at that time is to turn to right (turn the steering wheel 21 in the clockwise direction) and is realized by control of the brake actuator 35.

The preparatory brake pressure controlling means sets a preparatory brake pressure control mode M1 at this time. As the preparatory brake pressure control mode M1, there are a right front wheel control mode M1FR for applying the preparatory brake pressure to the braking force generating means $37_{FR}$ of the right front wheel $W_{FR}$, a left front wheel control mode M1FL, for applying the preparatory brake pressure to the braking force generating means $37_{FL}$ of the left front wheel $W_{FL}$, and a preparatory brake pressure off mode M1off in which the preparatory brake pressure is not applied to either of them.

When the preparatory brake pressure controlling means sets the right front wheel control mode M1FR, this controls the brake actuator 35 to apply the preparatory brake pressure to the right front wheel $W_{FR}$. At that time, the preparatory brake pressure controlling means allows the brake actuator 35 to close the master cut valve 42 and the pressure reducing valve 58 related to the right front wheel $W_{FR}$ and to open the holding valve 50, and to drive the motor 68 and the pressurizing pump 69 such that the preparatory brake pressure is applied to the braking force generating means $37_{FR}$ of the right front wheel $W_{FR}$. The brake actuator 35 at that time is controlled such that the master cut valve 43, the holding valves 51, 52 and 53 and the pressure reducing valves 59, 60 and 61 related to other wheels $W_{FL}$, $W_{RL}$ and $W_{RR}$, respectively, are closed and the braking force is not applied (preparatory brake pressure is not applied) to the other wheels $W_{FL}$, $W_{RL}$ and $W_{RR}$.

Also, when the preparatory brake pressure controlling means sets the left front wheel control mode M1FL, this controls the brake actuator 35 to apply the preparatory brake pressure to the left front wheel $W_{FL}$. At that time, the preparatory brake pressure controlling means allows the brake actuator 35 to close the master cut valve 43 and the pressure reducing valve 61 related to the left front wheel $W_{FL}$ and to open the holding valve 53, and to drive the motor 68 and the pressurizing pump 70 such that the preparatory brake pressure is applied to the braking force generating means $37_{FL}$ of the left front wheel $W_{FL}$. The brake actuator 35 at that time is controlled such that the master cut valve 42, the holding valves 50, 51 and 52 and the pressure reducing valves 58, 59 and 60 related to other wheels $W_{FR}$, $W_{RL}$ and $W_{RR}$ are closed and the braking force is not applied (preparatory brake pressure is not applied) to the other wheels $W_{FR}$, $W_{RL}$ and $W_{RR}$.

Also, when the preparatory brake pressure controlling means sets the preparatory brake pressure off mode M1off, this controls the brake actuator 35 such that the braking force is not applied (preparatory brake pressure is not applied) to each of the wheels $W_{FL}$, $W_{FR}$, $W_{RL}$ and $W_{RR}$. At that time, the preparatory brake pressure controlling means controls the brake actuator 35 at least not to drive the motor 68 and the pressurizing pumps 69 and 70.

Hereinafter, arithmetic processing operation (preparatory brake pressure control) of the vehicle behavior controlling apparatus of the first embodiment is described in detail with reference to flowcharts in FIGS. 3 and 4.

Figure 3:
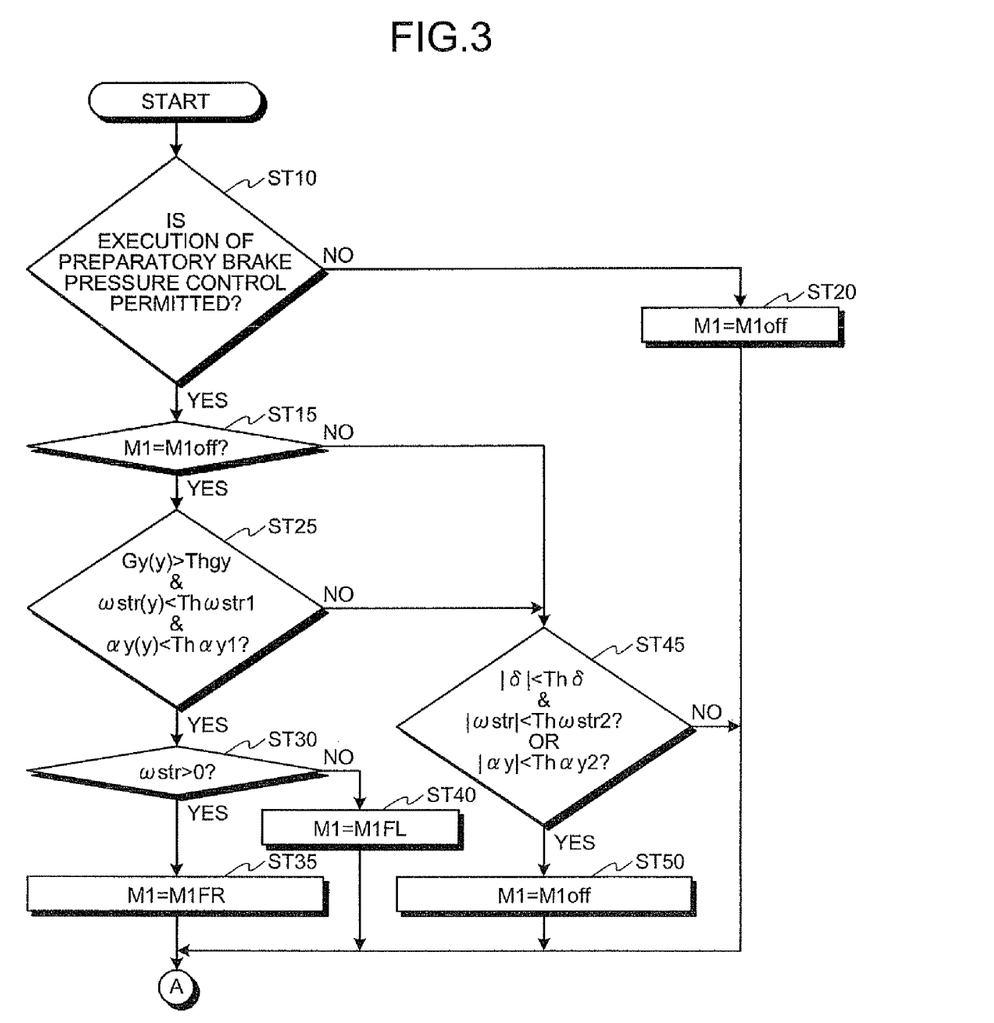
FIG. 3 is a flowchart for explaining a preparatory brake pressure control by the vehicle behavior controlling apparatus of a first embodiment.

First, the electronic control unit 1 judges whether execution of the preparatory brake pressure control may be permitted as illustrated in the flowchart in FIG. 3 (step ST10). The judgment at the step ST10 is to examine whether there is a trouble in executing the preparatory brake pressure control. For example, at the step ST10, it is judged that "the execution of the preparatory brake pressure control is permitted" when the vehicle is not braked and when the brake device and the sensor required for the ABS control, the VSC and the like normally act.

When it is judged that the execution of the preparatory brake pressure control is permitted at the step ST10, the preparatory brake pressure controlling means of the electronic control unit 1 judges whether the preparatory brake pressure control mode M1 is set to the preparatory brake pressure off mode M1off (step ST15). On the other hand, when it is judged that the execution of the preparatory brake pressure control cannot be permitted at the step ST10, the preparatory brake pressure controlling means sets the preparatory brake pressure control mode M1 to the preparatory brake pressure off mode M1off (step ST20). Meanwhile, the preparatory brake pressure control mode M1 is set to the preparatory brake pressure off mode M1off in an initial state (state in which the preparatory brake pressure control is never executed after ignition is turned on).

When the electronic control unit 1 judges that the preparatory brake pressure control mode M1 is set to the preparatory brake pressure off mode M1off at the step ST15, this allows the switchback steering detecting means to judge whether the switchback steering in which the application of the preparatory brake pressure is required is performed (step ST25). The judgment at the step ST25 is performed using the comparison result of the transverse acceleration Gy(y) and the predetermined threshold value Thgy, the comparison result of the steering angle speed ωstr(y) and the predetermined threshold value Thωstr1 and the comparison result of the yaw angle acceleration αy(y) and the predetermined threshold value Thαy1, as described above. At the step ST25, it is judged to be the time of the switchback steering, which requires the application of the preparatory brake pressure to the predetermined wheel, when the transverse acceleration Gy(y) is larger than the predetermined threshold value Thgy (>0), when the steering angle speed ωstr(y) of the steering wheel 21 is smaller than the predetermined threshold value Thωstr1 (<0) and when the yaw angle acceleration αy(y) is smaller than the predetermined threshold value Thαy1 (>0).

When it is judged that the switchback steering, which requires the application of the preparatory brake pressure, is performed at the step ST25 (affirmative judgment), the preparatory brake pressure controlling means judges whether the steering angle speed ωstr detected at that time is the positive value (ωstr>0), that is to say, whether the steering operation at the time of the switchback steering is to turn the vehicle 10 to left (step ST30).

When the preparatory brake pressure controlling means judges at the step ST30 that the steering angle speed ωstr is the positive value and it is the steering operation to turn the vehicle 10 to left, since the wheel, which becomes the front outer wheel in turning next, is the right front wheel $W_{FR}$, this sets the preparatory brake pressure control mode M1 to the right front wheel control mode M1FR (step ST35).

On the other hand, when the preparatory brake pressure controlling means judges that the steering angle speed ωstr is not the positive value at the step ST30, this judges that the steering angle speed ωstr is the negative value (ωstr<0) and that the steering operation at the time of the switchback steering is to turn the vehicle 10 to right, and sets the preparatory brake pressure control mode M1 to the left front wheel control mode M1FL (step ST40).

When the preparatory brake pressure control mode M1 is set to the right front wheel control mode M1FR or the left front wheel control mode M1FL in this manner and when the preparatory brake pressure control in the preparatory brake pressure control mode M1 is performed after arithmetic processing described later, it is judged that the preparatory brake pressure control mode M1 is not set to the preparatory brake pressure off mode M1off at the above-described step ST15. In this case, the preparatory brake pressure controlling means judges whether an absolute value of the detected steering angle δ is smaller than a predetermined threshold value Thδ (>0) and an absolute value of the calculated steering angle speed ωstr is smaller than a predetermined threshold value Thωstr2 (>0), or whether an absolute value of the calculated yaw angle acceleration αy is smaller than a predetermined threshold value Thαy2 (>0) (step ST45). At the step ST45, it is affirmatively judged when the absolute value of the steering angle δ is smaller than the predetermined threshold value Thδ (>0) and the absolute value of the steering angle speed ωstr is smaller than the predetermined threshold value Thωstr2 (>0), or when the absolute value of the yaw angle acceleration αy is smaller than the predetermined threshold value Thαy2 (>0), and it is negatively judged in other cases.

At the step ST45, during the execution of the preparatory brake pressure control, when the absolute value of the steering angle δ is smaller than the predetermined threshold value Thδ (>0) and when the absolute value of the steering angle speed ωstr is smaller than the predetermined threshold value Thωstr2 (>0), or when the absolute value of the yaw angle acceleration αy is smaller than the predetermined threshold value Thαy2 (>0), that is to say, when it is affirmatively judged, it is judged to be returning operation of the steering wheel 21 to the steering center. Therefore, when the preparatory brake pressure controlling means affirmatively judges at the step ST45, this sets the preparatory brake pressure control mode M1 to the preparatory brake pressure off mode M1off (step ST50). Also, at the step ST45, there is a case in which it is affirmatively judged when the preparatory brake pressure control is not executed. In this case also, the procedure shifts to the step ST50 and the preparatory brake pressure controlling means sets the preparatory brake pressure control mode M1 to the preparatory brake pressure off mode M1off.

On the other hand, when it is negatively judged during the execution of the preparatory brake pressure control at the step ST45, it can be judged that the switchback steering is continued. Therefore, when it is negatively judged at the step ST45, the preparatory brake pressure controlling means maintains the preparatory brake pressure control mode M1 (right front wheel control mode M1FR or left front wheel control mode M1FL), which is currently set. Also, at the step ST45, there is a case in which it is negatively judged when the preparatory brake pressure control is not executed. In this case, the preparatory brake pressure controlling means keeps setting the preparatory brake pressure control mode M1 to the preparatory brake pressure off mode M1off.

Figure 4:
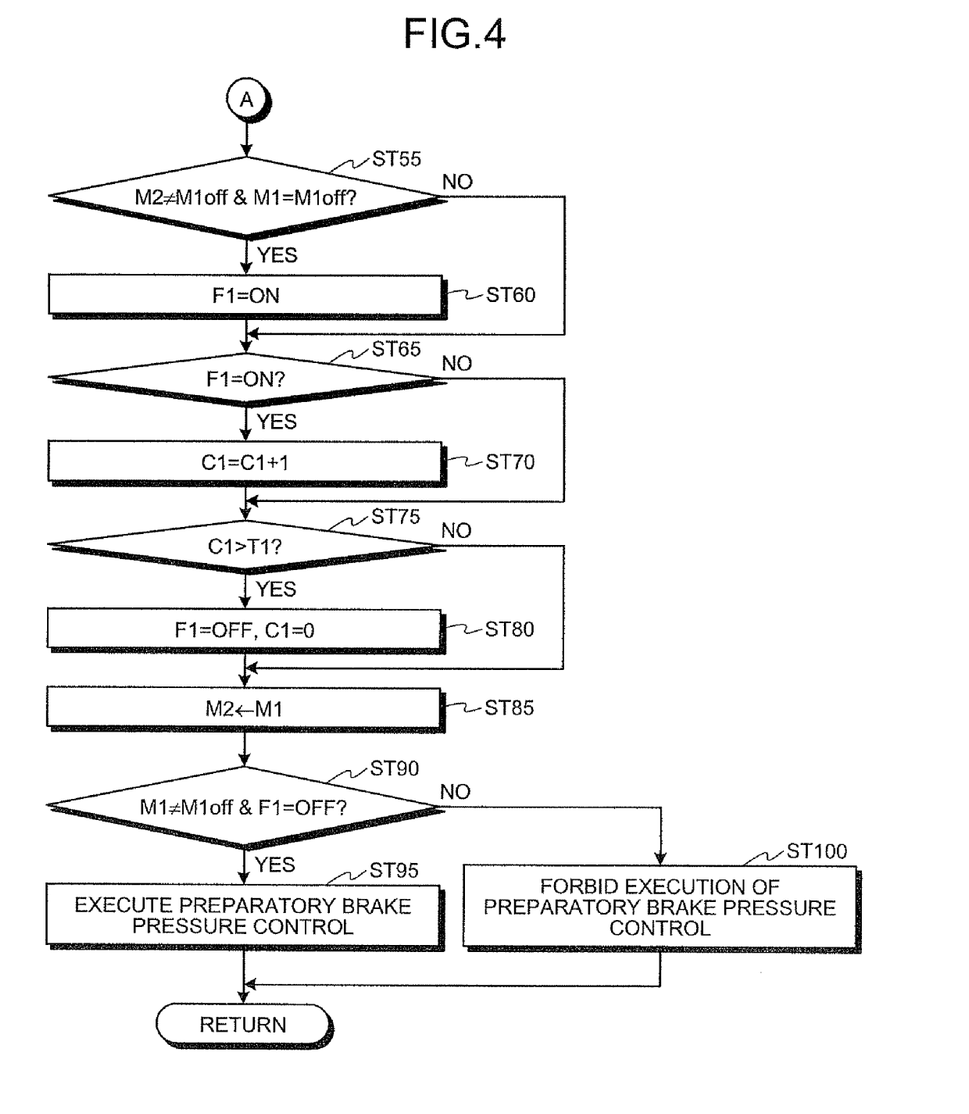
FIG. 4 is a flowchart for explaining the rest of the flowchart in FIG. 3.

After the preparatory brake pressure control mode M1 (preparatory brake pressure off mode M1off, right front wheel control mode M1FR or left front wheel control mode M1FL) is set by the arithmetic processing in the flowchart in FIG. 3, the preparatory brake pressure controlling means judges whether a previous preparatory brake pressure control mode M2 is not the preparatory brake pressure off mode M1off and whether a current preparatory brake pressure control mode M1 is the preparatory brake pressure off mode M1off as illustrated in the flowchart in FIG. 4 (step ST55). At the step ST55, it is affirmatively judged if the previous preparatory brake pressure control mode M2 is the right front wheel control mode M1FR or the left front wheel control mode M1FL and when the current preparatory brake pressure control mode M1 is the preparatory brake pressure off mode M1off, and it is negatively judged in other cases. For example at the step ST55, it is negatively judged when the setting of the preparatory brake pressure control mode M1 is first setting (that is to say, when the previous preparatory brake pressure control mode M2 is not determined) and when the preparatory brake pressure control is continuing (when both of the previous preparatory brake pressure control mode M2 and the current preparatory brake pressure control mode M1 are the right front wheel control mode M1FR or the left front wheel control mode M1FL).

When the preparatory brake pressure controlling means affirmatively judges at the step ST55, this judges that the preparatory brake pressure control associated with the switchback steering is executed once and the next steering operation is the returning operation of the steering wheel 21 to the steering center, and sets a preparatory brake pressure control operation once flag F1 (F1=ON) (step ST60). The preparatory brake pressure control operation once flag F1 indicates that the execution of the preparatory brake pressure control is finished once.

Subsequently, after negatively judging at the above-described step ST55 or after setting the preparatory brake pressure control operation once flag F1 at the above-described step ST60, the preparatory brake pressure controlling means judges whether the preparatory brake pressure control operation once flag F1 is set (step ST65). At the step ST65, it is affirmatively judged when this is after the above-described step ST60, and it is negatively judged when it is negatively judged at the above-described step ST55, for example, when the preparatory brake pressure control mode M1 is set to the right front wheel control mode M1FR or the left front wheel control mode M1FL.

When it is judged that the preparatory brake pressure control operation once flag F1 is set at the step ST65, the preparatory brake pressure controlling means counts a time during which the preparatory brake pressure control operation once flag F1 is set (hereinafter, referred to as "operation flag elapsed time") C1 (C1=C1+1) (step ST70).

Subsequently, after negatively judging at the above-described step ST65 or after counting the operation flag elapsed time C1 at the above-described step ST70, the preparatory brake pressure controlling means judges whether the operation flag elapsed time C1 becomes longer than a predetermined time T1 (step ST75). The predetermined time T1 is a maximum time during which the execution of the preparatory brake pressure control is forbidden and is set to a response time (1 second and the like) of behavior change of the vehicle 10 associated with the steering operation, for example. That is to say, the judgment at the step ST75 is to forbid the execution of the preparatory brake pressure control until the operation flag elapsed time C1 becomes longer than the predetermined time T1 when the preparatory brake pressure control associated with the switchback steering is executed once and the returning operation of the steering wheel 21 to the steering center is performed next. At the step ST75, it is negatively judged not only when the operation flag elapsed time C1 counted at the above-described step ST70 is shorter than the predetermined time T1 but also when it is judged that the preparatory brake pressure control operation once flag F1 is not set at the above-described step ST65, for example, when the preparatory brake pressure control mode M1 is set to the right front wheel control mode M1FR or the left front wheel control mode M1FL.

When the preparatory brake pressure controlling means judges that the operation flag elapsed time C1 becomes longer than the predetermined time T1 at the step ST75, this unsets the preparatory brake pressure control operation once flag F1 (F1=OFF) and resets the operation flag elapsed time C1 (C1=0) (step ST80). According to this, when the switchback steering is performed again after the returning operation of the steering wheel 21 to the steering center, the preparatory brake pressure control forbidden for a certain time (=predetermined time T1) can be executed again.

Subsequently, the preparatory brake pressure controlling means applies the current preparatory brake pressure control mode M1 as the previous preparatory brake pressure control mode M2 (M2←M1) after it is negatively judged at the above-described step ST75 or after the above-described step ST80 (step ST85).

Then, the preparatory brake pressure controlling means judges whether the current preparatory brake pressure control mode M1 is not the preparatory brake pressure off mode M1off and whether the preparatory brake pressure control operation, once flag F1 is unset (step ST90).

When the preparatory brake pressure controlling means affirmatively judges at the step ST90, this executes the preparatory brake pressure control according to the preparatory brake pressure control mode M1 (right front wheel control mode M1FR or left front wheel control mode M1FL) set at the above-described step ST35 or the above-described step ST40 (step ST95). According to this, the preparatory brake pressure control is started or continued when this is in execution.

On the other hand, when the preparatory brake pressure controlling means negatively judges at the step ST90, this forbids the execution of the preparatory brake pressure control (step ST100). According to this, when the steering operation to return the steering wheel 21 to the steering center is performed after the preparatory brake pressure control is executed once, the execution of the preparatory brake pressure control is forbidden. That is to say, when the returning operation of the steering wheel 21 to the steering center is performed during the switchback steering, the preparatory brake pressure controlling means can prevent the execution of the preparatory brake pressure control associated with erroneous judgment that this is the switchback steering.

In this manner, the vehicle behavior controlling apparatus of the first embodiment applies the preparatory brake pressure to the wheel, which becomes the front outer wheel in turning next, when the switchback steering is detected. When there is possibility that the excessive yaw moment acts on the vehicle 10 along with the switchback steering, the vehicle behavior controlling apparatus (vehicle behavior controlling means of the electronic control unit 1) applies the brake fluid pressure for generating the yaw moment in the opposite direction for inhibiting the excessive yaw moment on the vehicle body for the wheel to which the preparatory brake pressure is applied. According to this, the vehicle 10 can perform turn operation with the behavior thereof stabilized while inhibiting the excessive roll amount associated with the switchback steering.

Also, after executing the preparatory brake pressure control associated with the switchback steering, when the returning operation of the steering wheel 21 to the steering center is performed, there is a case in which the vehicle behavior controlling apparatus judges that the returning operation is the steering operation in the opposite direction in the switchback steering at the above-described step ST25 depending on the steering angle speed ωstr(y) and the like at that time. Therefore, the vehicle behavior controlling apparatus starts the preparatory brake pressure control associated with the switchback steering based on the erroneous judgment. However, in the returning operation to the steering center, there will be the time at which, as the steering wheel 21 moves closer to the steering center, the steering angle speed ωstr(y) becomes not smaller than the threshold value Thωstr1 and it is negatively judged at the above-described step ST25, and it is affirmatively judged at the above-described step ST45. When it is affirmatively judged, the vehicle behavior controlling apparatus sets the preparatory brake pressure control mode M1 to the preparatory brake pressure off mode M1off at the above-described step ST50 and the preparatory brake pressure control being executed is stopped at the above-described step ST100 later. At that time, it is preferable to control the brake fluid pressure circuit of the brake actuator 35 related to the wheel in which the preparatory brake pressure control is executed to a pressure reducing mode to release the preparatory brake pressure started to be applied to the wheel. Further, the vehicle behavior controlling apparatus is configured such that a forbidden state of the preparatory brake pressure control is continued at least for the predetermined time T1. According to this, the vehicle behavior controlling apparatus can prevent a situation in which the preparatory brake pressure associated with the erroneous judgment to be the switchback steering is applied to the front wheel opposite to the wheel, which is the control target in the previous normally executed preparatory brake pressure control. Therefore, the vehicle behavior controlling apparatus does not unnecessarily decrease the yaw moment in the opposite direction generated in the previous vehicle behavior control (vehicle behavior control executed for the wheel, which is the control target in the previous normally executed preparatory brake pressure control), so that control accuracy of the behavior stabilization of the vehicle when performing the returning operation of the steering wheel 21 to the steering center in the middle of the switchback steering can be improved.

[Second Embodiment]

Next, a second embodiment of the vehicle behavior controlling apparatus according to the present invention is described.

The vehicle behavior controlling apparatus of the second embodiment is obtained by changing following points of the above-described vehicle behavior controlling apparatus of the first embodiment. In the second embodiment also, the vehicle behavior controlling apparatus is illustrated to be applied to the vehicle 10 illustrated in the first embodiment.

The vehicle behavior controlling apparatus of the second embodiment is configured such that each of the threshold values Thgy, Thωstr1 and Thαy1 used in the judgment whether it is the switchback steering is gradually increased with elapse of time of the forbidden state (that is to say, the operation flag elapsed time C1) at least during the predetermined time T1 in which the forbidden state of the preparatory brake pressure control continues. For example, the vehicle behavior controlling apparatus of the second embodiment is configured such that it is hard to judge that "it is the switchback steering" while the forbidden state of the preparatory brake pressure control is continued by gradually increasing each of the threshold values Thgy, Thωstr1 and Thαy1 during this time. That is to say, herein, each of the threshold values Thgy, Thωstr1 and Thαy1, which is a condition for detecting the steering operation from one direction to the opposite direction of the steering wheel 21, is set such that it is hard to detect the steering operation from one direction to the other direction during the above-described forbidden state in which the application control of the preparatory brake pressure is inhibited.

Each of the threshold values Thgy, Thωstr1 and Thαy1 is calculated by threshold value setting means provided on the electronic control unit 1. The threshold value setting means changes each of the threshold values Thgy, Thωstr1 and Thαy1 based on following equations 1 to 3. "C1" in the equations 1 to 3 represents the operation flag elapsed time also used in the first embodiment.

$$Thgy = Thgy \times (1+C1) \quad (1)$$

$$Th\omega str1 = Th\omega str1 \times (1+C1) \quad (2)$$

$$Th\alpha y1 = Th\alpha y1 \times (1+C1) \quad (3)$$

The arithmetic processing operation of the vehicle behavior controlling apparatus of the second embodiment can be described in detail with reference to flowcharts in FIGS. 4 and 5. Since the arithmetic processing operation is identical to the arithmetic processing operation of the first embodiment in many parts, difference thereof from the first embodiment is herein described.

Figure 5:
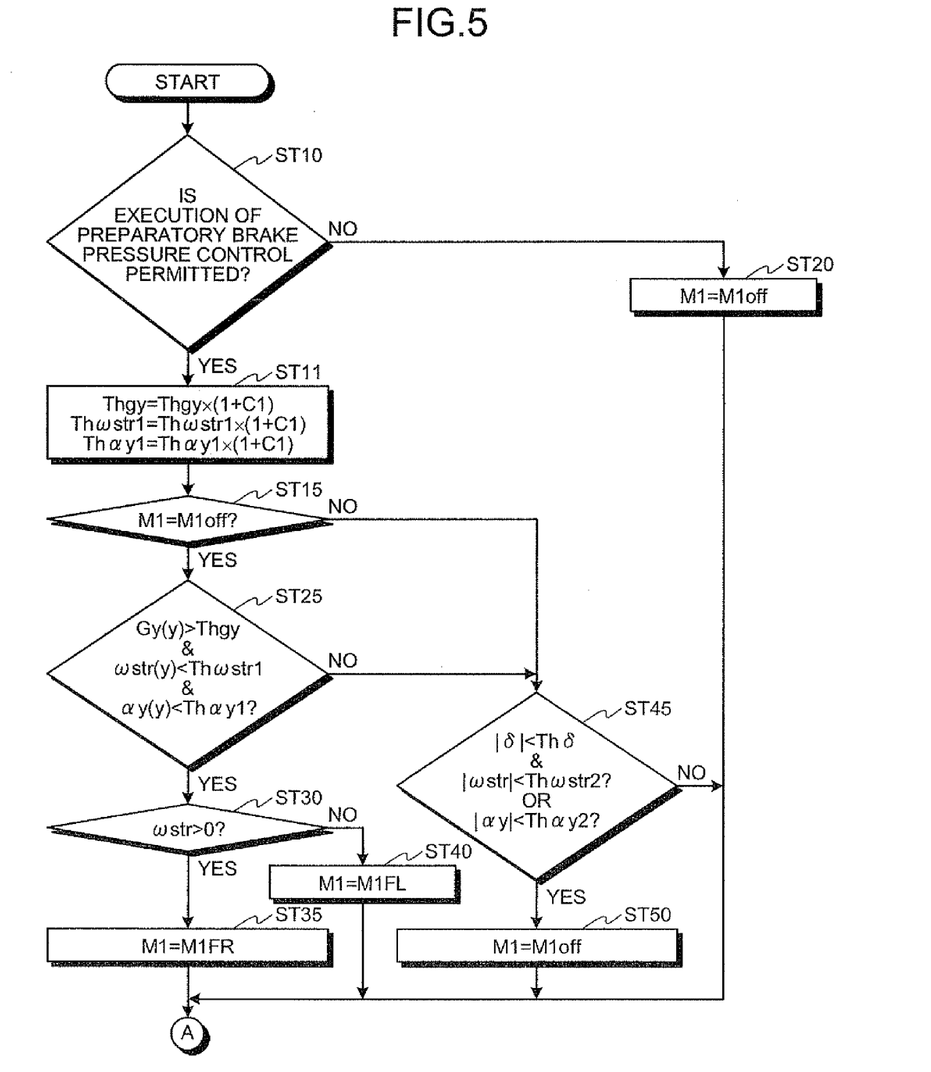
FIG. 5 is a flowchart for explaining the preparatory brake pressure control by the vehicle behavior controlling apparatus of a second embodiment.

In the second embodiment, when it is judged that the electronic control unit 1 permits the execution of the preparatory brake pressure control at the step ST10 illustrated in FIG. 5, the threshold value setting means is allowed to execute setting of each of the threshold values Thgy, Thωstr1 and Thαy1 based on the above-described equations 1 to 3 (step ST11).

At the step ST11, if the preparatory brake pressure control is not in the forbidden state, the operation flag elapsed time C1(=0) is substituted to obtain each of the threshold values Thgy, Thωstr1 and Thαy1. For example, the threshold values Thgy, Thωstr and Thαy1 as large as those of the first embodiment are calculated at that time.

Also, at the step ST11, if the preparatory brake pressure control is in the forbidden state, the operation flag elapsed time C1 counted at the step ST70 in FIG. 4 during the same is substituted. The operation flag elapsed time C1 continues increasing until the predetermined time T1 elapses, so that each of the threshold values Thgy, Thωstr1 and Thαy1 increases according to increase in the operation flag elapsed time C1. According to this, while the preparatory brake pressure control is in the forbidden state, as the threshold values Thgy, Thωstr1 and Thαy1 increase, the affirmative judgment (judgment of switchback steering) becomes hard at the step ST25 in FIG. 5. In other words, since it becomes hard to judge that it is the switchback steering during the same, it becomes hard to execute the preparatory brake pressure control. Therefore, the vehicle behavior controlling apparatus of the second embodiment can accurately maintain the forbidden state of the preparatory brake pressure control during the same and an effect similar to that of the first embodiment becomes more appropriate. That is to say, the vehicle behavior controlling apparatus of the second embodiment can further improve the control accuracy of the behavior stabilization of the vehicle when the returning operation to the steering center is performed in the middle of the switchback steering than that of the first embodiment.

[Third Embodiment]

Next, a third embodiment of the vehicle behavior controlling apparatus according to the present invention is described.

The vehicle behavior controlling apparatus of the third embodiment is obtained by changing following points of the above-described vehicle behavior controlling apparatus of the first embodiment. In the third embodiment also, the vehicle behavior controlling apparatus is illustrated to be applied to the vehicle 10 illustrated in the first embodiment.

The vehicle behavior controlling apparatus of the third embodiment is configured such that, for each of the threshold values Thgy, Thωstr1 and Thαy1 used in the judgment whether it is the switchback steering, a larger value than that of other times (hereinafter, referred to as "normal time") is used at least during the predetermined time T1 in which the forbidden state of the preparatory brake pressure control continues. For example, in the vehicle behavior controlling apparatus of the third embodiment, by using the larger value as each of the threshold values Thgy, Thωstr1 and Thαy1 during this time, it becomes hard to judge that "it is the switchback steering" while the forbidden state of the preparatory brake pressure control is continued. That is to say, herein, each of the threshold values Thgy, Thωstr1 and Thαy1, which is the condition for detecting the steering operation from one direction to the opposite direction of the steering wheel 21, is set such that it is hard to detect the steering operation from one direction to the other direction during the above-described forbidden state in which the application control of the preparatory brake pressure is inhibited.

For example, in the third embodiment, the threshold values Thgy, Thωstr1 and Thαy1 as large as those of the first embodiment are set as the threshold values Thgy, Thωstr1 and Thαy1 of the normal time. Hereinafter, the threshold values Thgy, Thωstr1 and Thαy1 of the normal time are indicated as threshold values ThgyLo, Thωstr1Lo and Thαy1Lo, respectively.

On the other hand, in the third embodiment, as threshold values ThgyHi, Thωstr1Hi and Thαy1Hi in the preparatory brake pressure control forbidden state, those of larger values than the threshold values ThgyLo, Thωstr1Lo and Thαy1Lo of the normal time are prepared. As the threshold values ThgyHi, Thωstr1Hi and Thαy1Hi, those of magnitude capable of accurately maintain the forbidden state during the forbidden state of the preparatory brake pressure control are set by performing examination and simulation in advance.

The vehicle behavior controlling apparatus of the third embodiment allows the threshold value setting means provided in the electronic control unit 1 to execute switching of the threshold values ThgyLo, Thωstr1Lo and Thαy1Lo of the normal time and the threshold values ThgyHi, Thωstr1Hi and Thαy1Hi in the preparatory brake pressure control forbidden state.

The arithmetic processing operation of the vehicle behavior controlling apparatus of the third embodiment can be described in detail with reference to flowcharts in FIGS. 4 and 6. Since the arithmetic processing operation is identical to the arithmetic processing operation of the first embodiment in many parts, difference thereof from the first embodiment is herein described.

Figure 6:
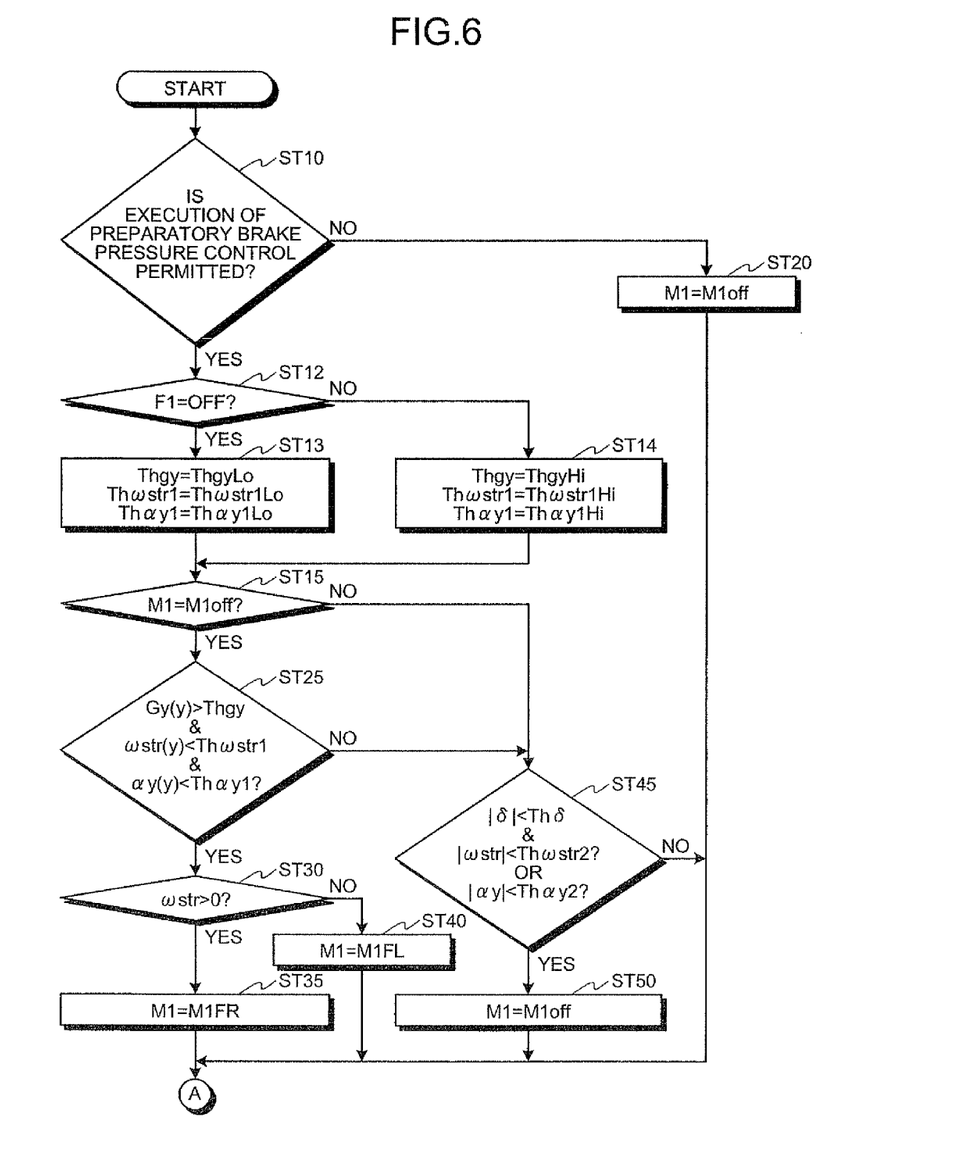
FIG. 6 is a flowchart for explaining the preparatory brake pressure control by the vehicle behavior controlling apparatus of a third embodiment.

In the third embodiment, when it is judged that the electronic control unit 1 permits the execution of the preparatory brake pressure control at the step ST10 illustrated in FIG. 6, the threshold value setting means is allowed to execute the judgment whether the preparatory brake pressure control operation once flag F1 is unset (step ST12).

When it is judged that the preparatory brake pressure control operation once flag F1 is unset at the step ST12, the threshold value setting means judges that it is not in the forbidden state of the preparatory brake pressure control and sets the threshold values ThgyLo, Thωstr1Lo and Thαy1Lo of the normal time as the threshold values Thgy, Thωstr1 and Thαy1 (step ST13). The threshold value setting means performs the judgment at the step ST25 in FIG. 6 using the threshold values ThgyLo, Thωstr1Lo and Thαy1Lo of the normal time until the preparatory brake pressure control operation once flag F1 is set (that is to say, after executing the preparatory brake pressure control once, until the returning operation of the steering wheel 21 to the steering center is performed and the execution of the preparatory brake pressure control is forbidden) at the step ST60 in FIG. 4.

When the preparatory brake pressure control operation once flag F1 is set at the step ST60 and the threshold value setting means judges that the preparatory brake pressure control operation once flag F1 is set at the above-described step ST12, this judges that the preparatory brake pressure control is in the forbidden state and sets the threshold values ThgyHi, Thωstr1Hi and Thαy1Hi in the preparatory brake pressure control forbidden state as the threshold values Thgy, Thωstr1 and Thαy1 (step ST14). According to this, during the forbidden state of the preparatory brake pressure control, the affirmative judgment (judgment that it is the switchback steering) becomes hard at the step ST25. In other words, since it becomes hard to judge that it is the switchback steering during the same, it becomes hard to execute the preparatory brake pressure control. Therefore, the vehicle behavior controlling apparatus of the third embodiment can accurately maintain the forbidden state of the preparatory brake pressure control during this time and an effect similar to that of the first embodiment becomes more appropriate. That is to say, the vehicle behavior controlling apparatus of the third embodiment can further improve the control accuracy of the behavior stabilization of the vehicle when the returning operation to the steering center is performed in the middle of the switchback steering than that of the first embodiment.

Although application control of the preparatory brake pressure is inhibited by forbidding the application control of the preparatory brake pressure in the vehicle behavior controlling apparatus of each of the above-described first to third embodiments, as for the application control of the preparatory brake pressure, it is also possible to inhibit an application amount of the preparatory brake pressure (that is to say, the brake fluid pressure to the wheel, which is the control target) low, and the effect similar to that of each of the first to third embodiments can be obtained also by configuring the preparatory brake pressure control means so as to execute such control.

Also, in the vehicle behavior controlling apparatus of each of the above-described first to third embodiments, the preparatory brake pressure is described as the brake fluid pressure to generate the light braking force, which does not obviously decrease the rotational speed of the wheels $W_{FL}$ and $W_{FR}$, which are the control targets. However, the preparatory brake pressure may be the brake fluid pressure in a state in which such braking force is not generated. For example, such preparatory brake pressure is the brake fluid pressure capable of starting to press the brake pad toward the disc rotor by slight increase in the brake fluid pressure, the brake fluid pressure capable of narrowing an interval between the brake pad and the disc rotor without allowing them to be brought into contact with each other and the like.

Also, the vehicle behavior controlling apparatus of each of the first to third embodiment is configured to apply the preparatory brake pressure to the wheel, which becomes the front outer wheel in turning next in the above-described vehicle behavior control, and on the other hand to inhibit the application of the preparatory brake pressure when the above-described predetermined condition is satisfied. However, in the vehicle behavior control, it is possible to turn the vehicle 10 with the behavior thereof stabilized while inhibiting the excessive roll amount even when the braking force is applied to the rear outer wheel in turning. Therefore, the vehicle behavior controlling apparatus may be configured to apply the preparatory brake pressure to the wheel, which becomes the rear outer wheel in turning next in the vehicle behavior control, and on the other hand, to inhibit application of the preparatory brake pressure to the rear wheel when the predetermined condition is satisfied, and the effect similar to that of the above-described illustration can be obtained.

Industrial Applicability

As described above, the vehicle behavior controlling apparatus according to the present invention is useful as a technique to improve the control accuracy of the behavior stabilization of the vehicle when the returning operation to the steering center is performed in the middle of the switchback steering.

The invention claimed is:

1. A vehicle behavior controlling apparatus comprising:
a preparatory brake pressure controlling unit that, when steering operation in an opposite direction is detected after the steering operation of a steering wheel in one direction, applies a preparatory brake pressure to a wheel, which becomes an outer wheel in turning next along with the steering operation in the opposite direction, wherein
the preparatory brake pressure controlling unit is configured to inhibit application control of the preparatory brake pressure when returning operation of the steering wheel to the steering center in the middle of the switchback steering operation in which the steering operation in one rotational direction relative to the steering center and the steering operation in the other rotational direction relative to the steering center are alternately repeated.

2. The vehicle behavior controlling apparatus according to claim 1, wherein the preparatory brake pressure controlling unit is configured to inhibit an application amount of the preparatory brake pressure low, thereby inhibiting the application control of the preparatory brake pressure.

3. The vehicle behavior controlling apparatus according to claim 1, wherein the preparatory brake pressure controlling unit is configured to forbid the application control of the preparatory brake pressure, thereby inhibiting the application control of the preparatory brake pressure.

4. The vehicle behavior controlling apparatus according to claim 1, wherein a condition to detect the switchback steering operation is set such that it is hard to detect the steering operation from the one direction to the opposite direction when the application control of the preparatory brake pressure is being inhibited.

5. The vehicle behavior controlling apparatus according to claim 1, wherein a detection of the switchback steering operation is performed based on a comparison of transverse acceleration of a vehicle, a steering angle speed of the steering wheel and yaw angle acceleration of the vehicle with each of predetermined threshold values, respectively.

* * * * *